(12) United States Patent
Nguyen et al.

(10) Patent No.: US 6,470,440 B1
(45) Date of Patent: Oct. 22, 2002

(54) VECTOR COMPARE AND MAXIMUM/MINIMUM GENERATION APPARATUS AND METHOD THEREFOR

(75) Inventors: Huy Van Nguyen, Round Rock; Charles Philip Roth, Austin, both of TX (US)

(73) Assignee: International Business Machines Corporation, Armonk NY ( * ) Notice: Subject to any disclaimer, the term of this patent is extended or adjusted under 35 U.S.C. 154(b) by 0 days.

(21) Appl. No.: 09/315,546

(22) Filed: May 20, 1999

(51) Int. Cl.[7] .............................................. G06F 9/305
(52) U.S. Cl. .............................. 712/7; 708/207; 712/223
(58) Field of Search ............................ 708/207; 712/7, 712/223

(56) References Cited

U.S. PATENT DOCUMENTS 5,651,121 A * 7/1997 Davies ........................ 712/200
5,907,842 A * 5/1999 Mennemeier et al. ........... 707/7
6,029,244 A * 2/2000 Oberman et al. ............ 712/223

* cited by examiner

Primary Examiner—Kenneth S. Kim
(74) Attorney, Agent, or Firm—Barry S. Newberger; Winstead Sechrest & Minick P.C.; Robert M. Carwell

(57) ABSTRACT

An apparatus for compare and maximum/minimum and a method therefor are implemented. Selection circuitry selects a data value signal for outputting between an a pair of vector operands and "true" and "false" comparison value signals for the corresponding operand data type. Each input operand may include a plurality of subvector operands of a preselected data type, each data type has having a corresponding length. The selection circuitry selects the data value signal in response to a plurality of second signals. The second signals are generated from carry-out signals from the subvector operands, and first signals that are generated using instruction information for the executing instruction. The second signals may be generated by logically combining the first signals with carry propagate, carry generate and carry-out signals from carry lookahead logic receiving the subvector operands as input.

23 Claims, 6 Drawing Sheets

VECTOR COMPARE AND MAXIMUM/MINIMUM GENERATION APPARATUS AND METHOD THEREFOR

CROSS-REFERENCE TO RELATED APPLICATION

The present invention is related to U.S. patent application Ser. No. 09/315,545, entitled "Saturation Detection Apparatus and Method Therefor," which is hereby incorporated herein by reference.

TECHNICAL FIELD

The present invention relates in general to data processing systems, and in particular, to vector compare and extremum (maximum/minimum) operations in a data processor.

BACKGROUND INFORMATION

Vector processing extensions to microprocessor architectures are being implemented to enhance microprocessor performance, particularly with respect to multimedia applications. One such vector processing extension is the Vector Multimedia Extension (VMX) to the Power PC microprocessor architecture ("Power PC" is a trademark of IBM Corporation.) VMX is a single instruction multiple data (SIMD) architecture. In a SIMD architecture, a single instruction operates on multiple sets of operands. For example, an instruction having thirty-two bit operands may operate on the operands in bytewise fashion as four eight-bit operands, as sixteen bit half-word operands, or as word length operands of thirty-two bits.

In vector compare operations, the "true" and "false" results are equal to the largest and smallest unsigned numbers. One or the other value is output depending on the order relationship between the instruction source operands. In maximum/minimum operation, one of the source operands is output, depending on the relative size of the operands.

To implement these instructions, three tasks need to be performed. An intermediate result is produced, using a single adder, which may be embodied in an arithmetic unit, in accordance with the specific instruction being executed. Then, the appropriate result must be selected, either the "true" or "false" value or the appropriate source operand.

The task of selecting the appropriate value as a final result may be complicated and time consuming. In particular, these tasks are complicated in that the instructions support different data types, that is, subvector operands having different lengths, as described hereinabove, each of which may be either signed or unsigned. Consequently, it becomes difficult to meet cycle time requirements if the three tasks are performed sequentially.

Thus, there is a need in the art for apparatus and methods for implementing vector compare and vector maximum and vector minimum instructions, that are sufficiently fast to meet cycle time requirements. In particular, there is a need in the art for performing, in parallel, the tasks of generating an intermediate result and selecting a mode dependent result value.

SUMMARY OF THE INVENTION

The aforementioned needs are addressed by the present invention. Accordingly, there is provided, in a first form, a compare and maximum/minimum apparatus. The apparatus includes a compare generation unit having first and second operand inputs operable for receiving first and second vector operands, the compare generation unit operable for receiving an instruction signal, and outputting one or more second signals in response to the first and second operands and the instruction signal. Also included is selection circuitry operable for receiving the one or more of second signals, at least one operand signal, and one or more comparison value signals, wherein the selection circuitry selects one of the operand signals and the one or more of the comparison value signals in response to the one or more second signals.

There is also provided, in a second form, a method of compare and maximum/minimum generation. The method includes generating a set of first signals in response to an executing instruction, and generating a set of second signals in response to a carry-out signal and the set of first signals. Also included is the step of selecting for outputting one of a set of output signals including one or more operand signals and a predetermined set of comparison value signals in response to the set of second signals, wherein the first and second carry-out signals are generated in response to a pair of subvector operands, and the result signal is generated in response to the executing instruction.

Additionally, there is provided, in a third form, a data processing system which includes a central processing unit (CPU), and a memory operable for communicating instructions and operand data to the CPU, in which the CPU includes instruction decode circuitry and compare and maximum/minimum circuitry coupled to the memory. The decode circuitry is operable for receiving the instructions, and the compare and maximum/minimum circuitry, is operable for receiving the operand data from the memory, and operable for selecting a one of a plurality of output signals, wherein the plurality of output signals includes the operand data and a preselected set of "true" and "false" signals, the compare and maximum/minimum circuitry selecting the one of the plurality in response to the operand data and an instruction signal from the decode circuitry.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
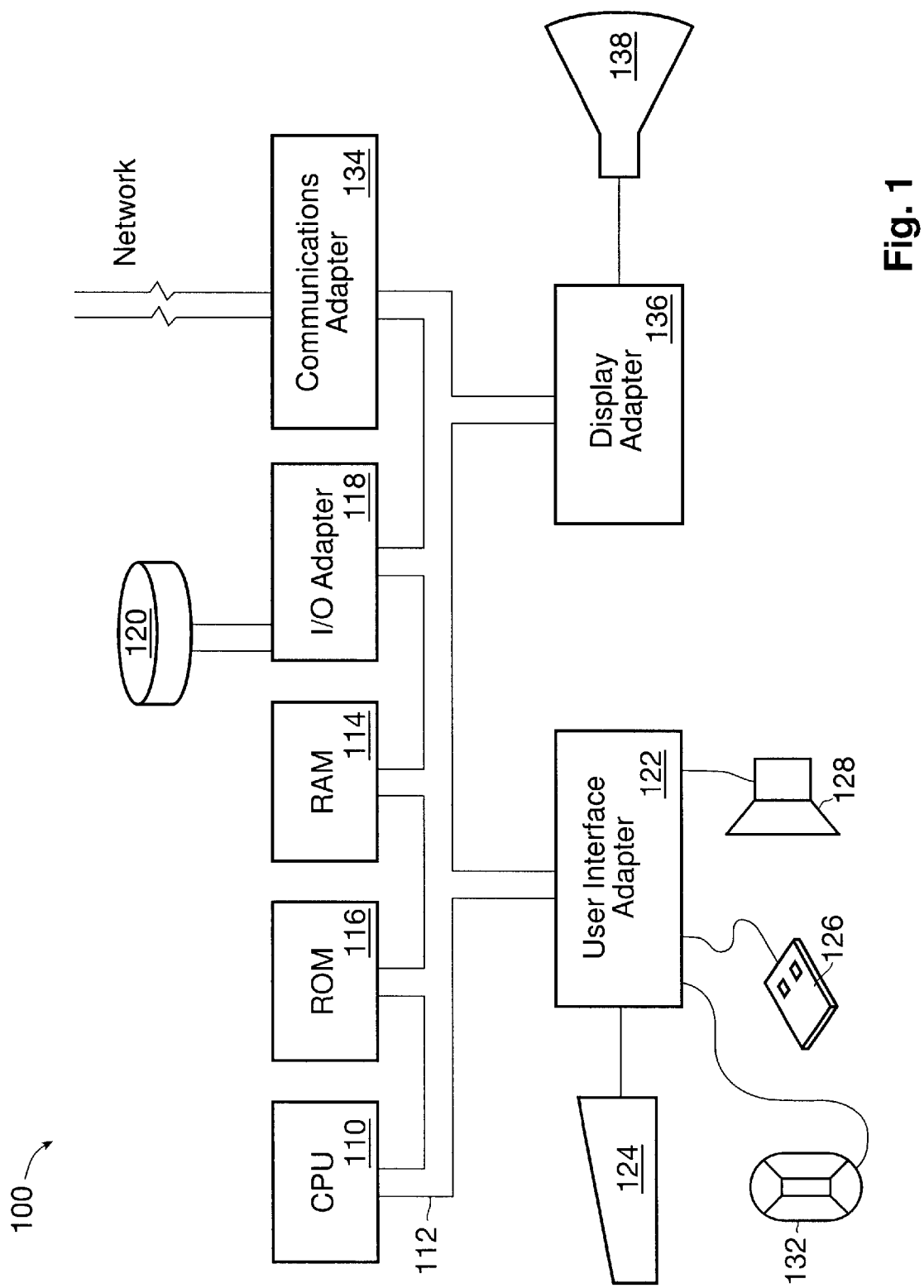
FIG. 1 illustrates, in block diagram form, a data processing system in accordance with an embodiment of the present invention.

A compare and maximum/minimum generation mechanism, which implements vector compare and maximum/minimum operations is provided. A saturation detection mechanism for vector addition and subtraction has been described in the commonly-owned, copending U.S. patent application, Ser. No. 09/315,545, entitled "Saturation Detection Apparatus and Method Therefor," which is incorporated herein by reference. The set of qualifiers described therein may be adapted to accommodate compare and maximum/minimum operations. Similarly, a set of select signals is generated in response to the modified set of qualifiers.

In the following description, numerous specific details, such as, specific operand lengths, are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. During the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via system bus 112. Data processing system 100 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting data processing system 100 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
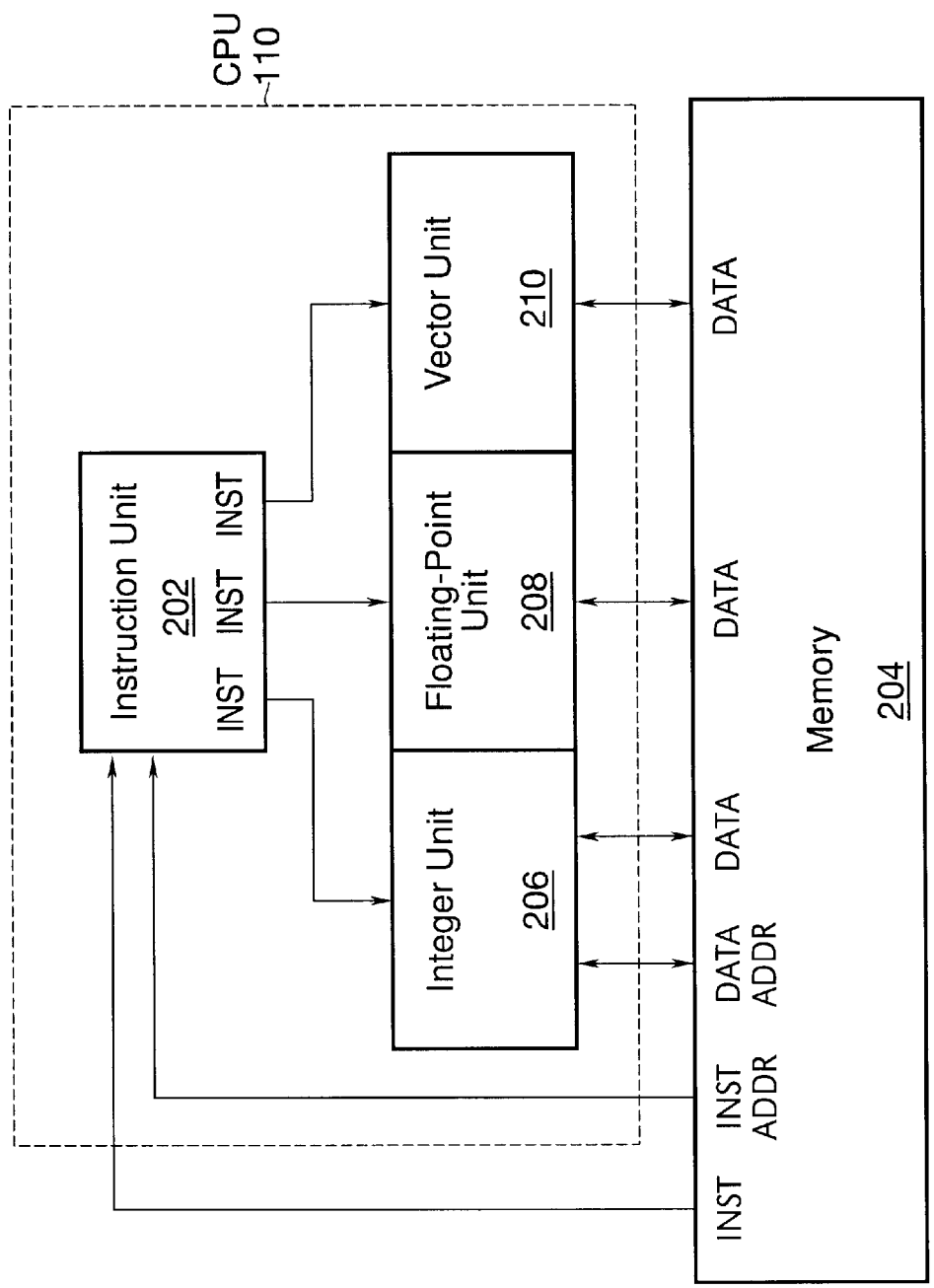
FIG. 2 illustrates, in block diagram form, a central processing unit in accordance with an embodiment of the present invention.

Refer now to FIG. 2 illustrating CPU 110 in further detail. CPU 110 includes instruction unit 202 that receives instructions passed from memory 204. Instruction unit 202 partially decodes the instructions and queues them for issuance to the appropriate one of integer unit 206, floating point unit 208 and vector unit 210. Integer unit 206, floating point unit 208 and vector unit 210 execute the instructions, and perform integer operations, floating point operations and vector operations, respectively. Compare and maximum/minimum generation in vector fixed point operations, in accordance with an embodiment of the present invention, may be included in vector unit 210.

Figure 3A:
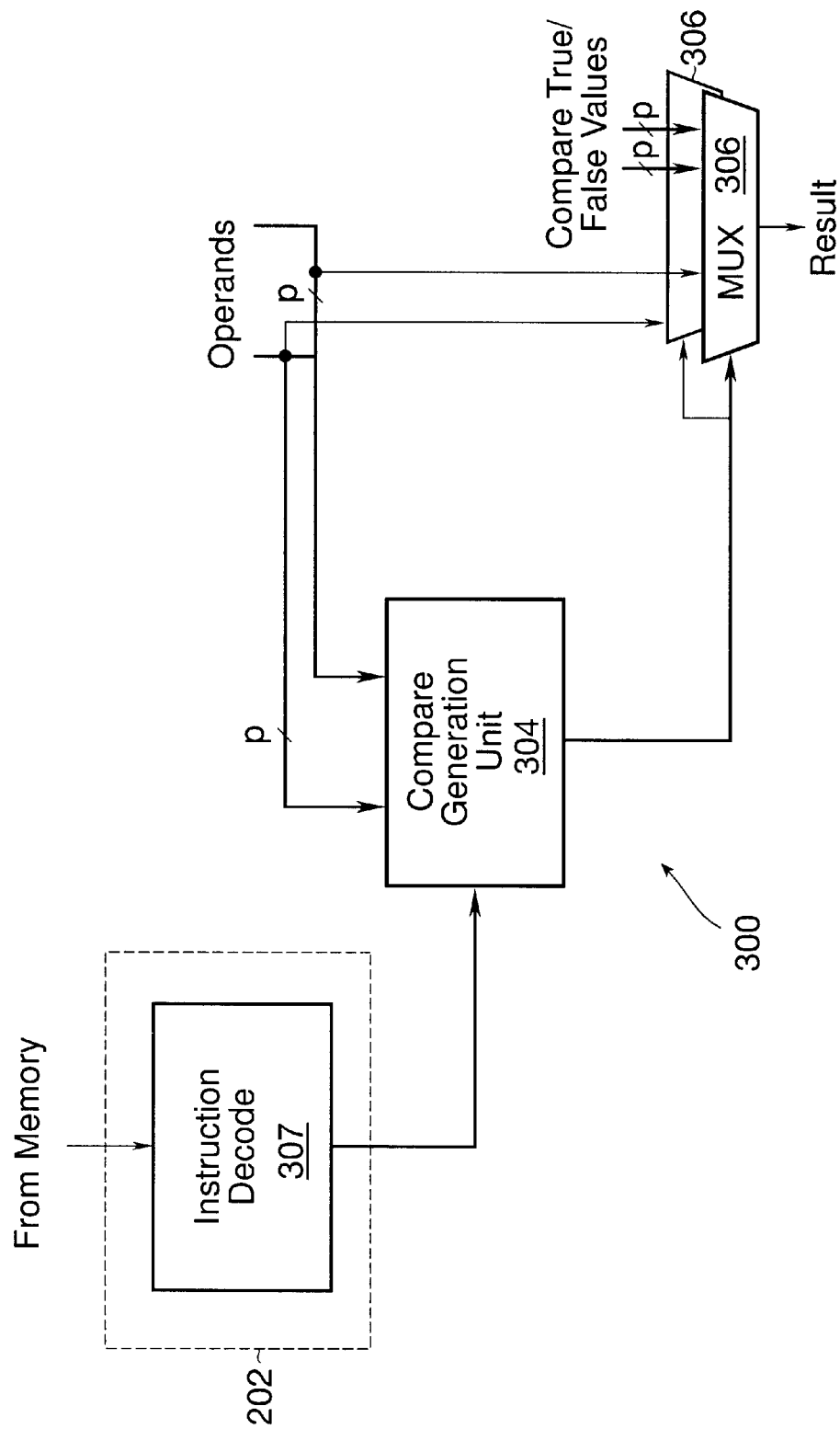
FIG. 3A illustrates, in block diagram form, a compare and maximum/minimum mechanism in accordance with an embodiment of the present invention.

Refer now to FIG. 3 illustrating a portion 300 of vector unit 210 in accordance with an embodiment of the present invention. Portion 300 includes compare generation unit 304 and multiplexer (MUX) 306.

Figure 3B:
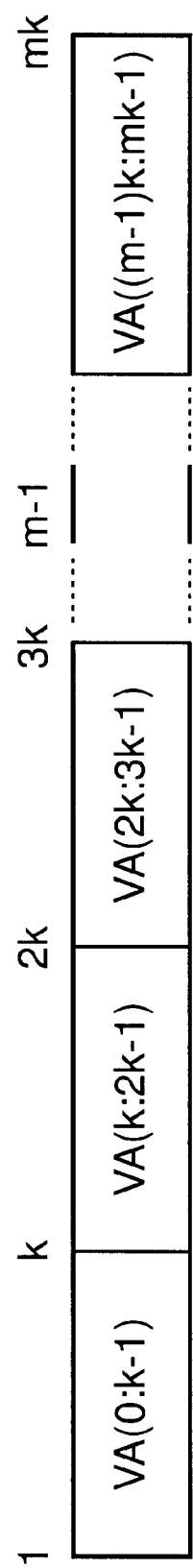
FIG. 3B illustrates a vector operand used in accordance with an embodiment of the present invention.

An exemplary vector operand, VA, is illustrated in FIG. 3B. As discussed hereinabove, corresponding vector arithmetic instructions may operate on operands having different lengths. A smallest operand may have a plurality, k, bits of data. Vector operand VA, in FIG. 3B, includes a plurality, m, portions, each of which is of length k. Thus, a maximum vector operand length may be m·k data bits. Vector instructions operate on subvector operands having data lengths which may be from k bits, to the maximum, m·k bits, with a corresponding instruction for each length subvector operand. (Hereinafter, the full operands will be generically referred to as vector operands, and the instruction data type, or k-length, operands will be referred to as subvector operands.) For example, there may be corresponding vector instructions for adding, in parallel, a first plurality of pairs of byte-length operands in which k=8, a second plurality of pairs of half-word, or sixteen bit operands, one or more pairs of word length, or thirty-two bit, operands, etc. Smallest subvector operands will be presumed to be byte-length operands, however in an alternative embodiment, the smallest operand may have other predetermined bit lengths, provided that the bit-length is a power of two. In an exemplary embodiment having a maximum data length of thirty-two bits, the first plurality may include four pairs, and the second plurality may include two pairs. In addition of the full thirty-two bit, operands may also be provided.

Figure 3C:
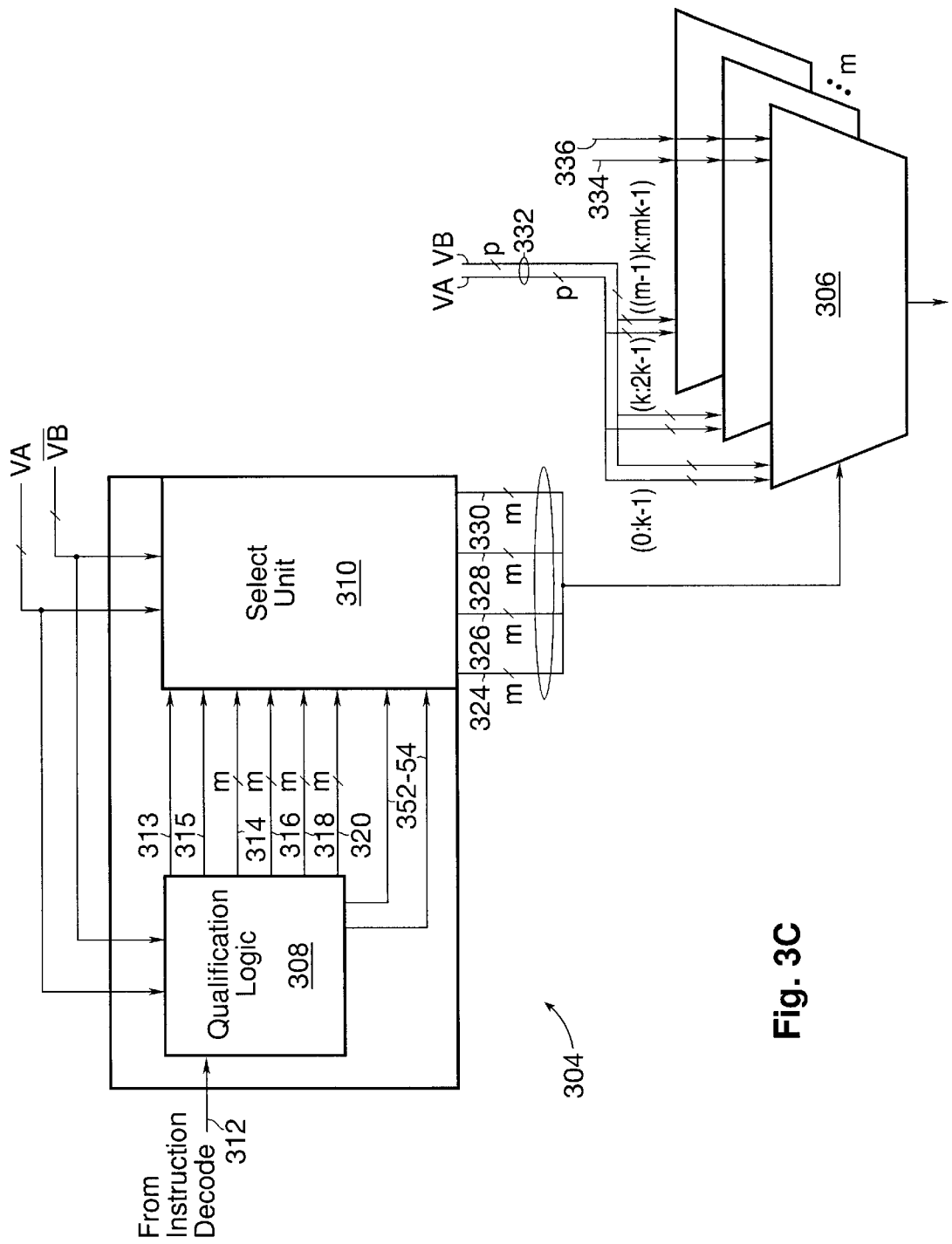
FIG. 3C illustrates, in block diagram form, a compare generation unit in accordance with an embodiment of the present invention.

Refer now to FIG. 3C illustrating compare generation unit 304 in greater detail. The sign bits of vector operands, VA and $\overline{VB}$, are input to qualifier logic 308. Signals VA and $\overline{VB}$ are also provided to compare select unit 310. Note that for vector compare and maximum/minimum instructions, the "B" operand is complemented before it gets to compare generation unit 304. Thus, $\overline{VB}$ is the complement of the "B" operand, VB, passed to integer unit 206 from memory 204 in FIG. 2. Additionally, instruction decode signal 312 is input to qualifier logic 308 to inform qualifier logic 308 which vector instruction is being executed. In response to the operands, and the instruction being executed, qualifier logic 308 outputs a plurality of m-bit-wide first signals 314–320, and 352–362, constituting a set of qualifier and unqualifier signals.

Each qualifier signal is generated in accordance with a corresponding Boolean equation. Qualifier 314, unsigned_ov_qual, is determined in accordance with Boolean Equation (1):

$$\text{unsigned\_ov\_qual} = (\text{add} \& \overline{\text{signed}} \& \text{sat\_mode}) | \qquad (1)$$

$$(\text{cmpgt} \& \overline{\text{signed}}) |$$

$$(\text{cmpgt} \& \text{signed} \& ((\overline{\text{va\_sign}} \& \text{vb\_sign}) | (\text{va\_sign} \& \overline{\text{vb\_sign}}))).$$

The Boolean variable signed is as defined in the co-pending, commonly assigned U.S. patent application entitled "Saturation Detection Apparatus and Method Therefor," Ser. No. 09/315,545, incorporated herein by reference. In an alternative embodiment of the present invention, the compare and maximum/minimum mechanism may be incorporated with the saturation detection mechanism in the aforementioned U.S. patent application. In such an embodiment, a first portion of qualifier 314, would become the logical expression add & $\overline{\text{signed}}$ & sat_mode, the same as the corresponding qualifier in the aforesaid co-pending commonly owned U.S. patent application. An artisan of ordinary skill would understand that the first signals defined below would be similarly modified in such an embodiment, which would be within the spirit and scope of the present invention. The additional logical expressions in Boolean Equation (1) incorporate the logical operations for generating qualifier 314 including a vector compare greater than integer instructions. The Boolean variable cmpgt is TRUE if the instruction being executed is a vector compare greater than instruction, and is FALSE otherwise. The logical expression cmpgt & $\overline{\text{signed}}$ implements vector compare greater than unsigned integer instruction, and the expression cmpgt & signed & (($\overline{\text{va\_sign}}$ & vb_sign)|va_sign & $\overline{\text{vb\_sign}}$)) implements the vector compare greater than signed integer with operands VA and VB into generation unit 304 having opposite signs. Signal cmpgt is provided by instruction decode logic 307 in instruction unit 202. The Boolean variables add, sub, signed, and va_sign appearing in Equation (1), or in other equations below, are as defined in the aforementioned commonly owned, co-pending U.S. patent application. Because $\overline{\text{VB}}$ is the complement of the "B" operand, vb_sign is then the complement of the sign bit of VB as defined in the aforementioned U.S. patent application. Likewise, qualifier signal 316, unsigned_uv_qual is determined in accordance with Boolean Equation (2):

$$\text{unsigned\_uv\_qual} = (\text{sub } \& \overline{\text{signed}} \& \text{sat\_mode}) | \quad (2)$$
$$(\text{cmpgt } \& \overline{\text{signed}}) |$$
$$(\text{cmpgt } \& \text{ signed} \& ((\overline{\text{va\_sign}} \& \text{vb\_sign}) | (\text{va\_sign} \& \overline{\text{vb\_sign}}))).$$

Two additional unqualifier signals are also used in implementing vector compare greater than instructions. One or the other of these signals is asserted when the vector operands VA and VB have the same sign. Signal 315, unsigned_ov_unqual, is defined by Boolean Equation (3):

$$\text{unsigned\_ov\_unqual} = \text{cmpgt } \& \text{ signed } \& (\overline{\text{va\_sign}} \& \overline{\text{vb\_sign}}) \quad (3).$$

Signal 317, unsigned_uv_unqual, is defined by Boolean Equation (4):

$$\text{unsigned\_uv\_unqual} = \text{cmpgt } \& \text{ signed } \& (\text{va\_sign } \& \text{ vb\_sign}) \quad (4).$$

Additionally, qualifier logic 308 generates a plurality of qualifier and unqualifier signals used to perform integer maximum and minimum operations in vector unit 210, FIG. 2. Qualifier signals 352, ma_qual, and 354, min_qual, are generated in accordance with Boolean Equations (5) and (6), respectively:

$$\text{max\_qual} = (\text{max } \& \overline{\text{signed}}) | (\text{max } \& \text{ signed } \& ((\overline{\text{va\_sign}} \& \text{vb\_sign}) | (\text{va\_sign} \& \text{vb\_sign}))) \quad (5).$$

$$\text{minqual} = (\text{min } \& \overline{\text{signed}}) | (\text{min } \& \text{ signed } \& ((\overline{\text{va\_sign}} \& \text{vb\_sign}) | (\text{va\_sign} \& \text{vb\_sign}))) \quad (6).$$

Qualifier 352 (354) corresponds to vector unsigned maximum (minimum) integer or vector signed maximum (minimum) integer with adder operands having different sign operation. Likewise, unqualifier signals 356, 358, 360, and 362 are generated according to Boolean Equations (7)–(10), as follows:

$$\text{max\_va\_unqual} = \text{max } \& \text{ signed } \& (\overline{\text{va\_sign}} \& \overline{\text{vb\_sign}}) \quad (7).$$

$$\text{max\_vb\_unqual} = \text{max } \& \text{ signed } \& (\overline{\text{va\_sign}} \& \text{vb\_sign}) \quad (8).$$

$$\text{min\_va\_unqual} = \text{min } \& \text{ signed } \& (\text{va\_sign } \& \text{ vb\_sign}) \quad (9).$$

$$\text{min\_vb\_unqual} = \text{min } \& \text{ signed } \& (\overline{\text{va\_sign}} \& \overline{\text{vb\_sign}}) \quad (10).$$

Unqualifier 356 (358) corresponds to vector signed maximum integer with positive (negative) adder operands operations, and unqualifier 360 (362) corresponds to vector signed minimum integer with positive (negative) adder operands operations. In Equations (7)–(12), the Boolean variable max is asserted if a vector maximum instruction is being executed and negated otherwise. Similarly, the Boolean variable min is asserted if a vector minimum instruction is being executed, and negated otherwise.

Each of first signals 314, 315, 316, 317, 318, and 320 includes m bits. Each of the m bits is generated by forming the logical AND of the corresponding qualifier signal, as determined from its respective Boolean equation, with a logical OR of a plurality of Boolean data-type signals. Additionally, with respect to first signals 318 and 320, data-type dependent sign bits, generically denoted va_sign and vb_sign, are used, as described further below. Operands having a maximum length of m·k bits supports a plurality, l, of data types, where l equals the base-two logarithm of m. A first data type has a length of m·k bits. a second data type has a length of (m·k)/2 bits, a third data type has a length of (m·k)/$2^2$ bits, etc., and an lth data type has a length of (m·k)/$2^l$=(m·k)/m=k, consistent with the definition of k. Associated with each data type is a corresponding Boolean signal, datatype_1, datatype_2, . . . , datatype1. For a sum or difference operation on a sth data type, the corresponding Boolean signal, data_type_s is asserted and the remaining Boolean signals are negated.

To make this concrete, consider the exemplary embodiment discussed hereinabove, in which the maximum length of the operand is thirty-two data bits (thirty-six bits total) including four data bytes (m=4, k=8). The first data type is thirty-two bits in size, the second data type has sixteen bits, and the third data type is a byte, or eight bits. The corresponding length Boolean signal is generated as the logical OR of three Boolean signals associated with each of the data types, datatype_1, datatype_2, and datatype_3, which using a more typical terminology, may be referred to as word, half word, and byte, respectively.

In this embodiment, each of the four bits of first signals 314, 315, 316, 317, 318, and 320, are then formed as specified in Equations (1)–(10), additionally logically combined with one or more of the Boolean signals datatype_1, datatype_2, and datatype_3, or equivalently, word, half word, and byte. Thus, $$\begin{aligned}
\text{unsigned\_ov\_qual}(0) = &\ ((\text{add} \ \&\ \overline{\text{signed}}\ \&\ \text{sat\_mode})| \\
&\ (\text{cmpgt} \ \&\ \overline{\text{signed}})\ | \\
&\ (\text{cmpgt} \ \&\ \text{signed} \ \&\ ((\ \overline{\text{va}(0)}\ \&\ \text{vb}\ (0))\ |\ (\text{va}\ (0)\ \&\ \overline{\text{vb}(0)}\ ))))\ \&\ \\
&\ (\text{byte}\ |\ \text{word}\ |\ \text{half-word}),
\end{aligned} \quad (11)$$

$$\begin{aligned}
\text{unsigned\_ov\_qual}(1) = &\ ((\text{add} \ \&\ \overline{\text{signed}}\ \&\ \text{sat\_mode})| \\
&\ (\text{cmpgt} \ \&\ \overline{\text{signed}})\ | \\
&\ (\text{cmpgt} \ \&\ \text{signed} \ \&\ ((\ \overline{\text{va}(8)}\ \&\ \text{vb}\ (8))\ |\ (\text{va}\ (8)\ \&\ \overline{\text{vb}(8)}\ ))))\ \&\ \\
&\ \text{byte},
\end{aligned}$$

$$\begin{aligned}
\text{unsigned\_ov\_qual}(2) = &\ ((\text{add} \ \&\ \overline{\text{signed}}\ \&\ \text{sat\_mode})| \\
&\ (\text{cmpgt} \ \&\ \overline{\text{signed}})\ | \\
&\ (\text{cmpgt} \ \&\ \text{signed} \ \&\ ((\ \overline{\text{va}(16)}\ \&\ \text{vb}\ (16))\ | \\
&\ (\text{va}\ (16)\ \&\ \overline{\text{vb}(16)}\ ))))\ \&\ \\
&\ (\text{byte}\ |\ \text{half-word}),
\end{aligned}$$

$$\begin{aligned}
\text{unsigned\_ov\_qual}(3) = &\ ((\text{add} \ \&\ \overline{\text{signed}}\ \&\ \text{sat\_mode})| \\
&\ (\text{cmpgt} \ \&\ \overline{\text{signed}})\ | \\
&\ (\text{cmpgt} \ \&\ \text{signed} \ \&\ ((\ \overline{\text{va}(24)}\ \&\ \text{vb}\ (24))\ | \\
&\ (\text{va}\ (24)\ \&\ \overline{\text{vb}(24)}\ ))))\ \&\ \\
&\ \text{byte}.
\end{aligned}$$

$$\begin{aligned}
\text{unsigned\_uv\_qual}(0) = &\ ((\text{sub} \ \&\ \overline{\text{signed}}\ \&\ \text{sat\_mode})| \\
&\ (\text{cmpgt} \ \&\ \overline{\text{signed}}\ )\ | \\
&\ (\text{cmpgt} \ \&\ \text{signed} \ \&\ ((\ \overline{\text{va}(0)}\ \&\ \text{vb}\ (0))\ |\ (\text{va}\ (0)\ \&\ \overline{\text{vb}(0)}\ ))))\ \&\ \\
&\ (\text{byte}\ |\ \text{word}\ |\ \text{half-word}),
\end{aligned} \quad (12)$$

$$\begin{aligned}
\text{unsigned\_uv\_qual}(1) = &\ ((\text{sub} \ \&\ \overline{\text{signed}}\ \&\ \text{sat\_mode})\ | \\
&\ (\text{cmpgt} \ \&\ \overline{\text{signed}})\ |\ (\text{cmpgt} \ \&\ \text{signed} \ \&\ ((\ \overline{\text{va}(8)}\ \&\ \text{vb}\ (8))\ | \\
&\ (\text{va}\ (8)\ \&\ \overline{\text{vb}(8)}\ ))))\ \&\ \\
&\ \text{byte},
\end{aligned}$$

$$\begin{aligned}
\text{unsigned\_uv\_qual}(2) = &\ ((\text{sub} \ \&\ \overline{\text{signed}}\ \&\ \text{sat\_mode})\ | \\
&\ (\text{cmpgt} \ \&\ \overline{\text{signed}}\ )\ | \\
&\ (\text{cmpgt} \ \&\ \text{signed} \ \&\ ((\ \overline{\text{va}(16)}\ \&\ \text{vb}\ (16))\ | \\
&\ (\text{va}\ (16)\ \&\ \overline{\text{vb}(16)}\ ))))\ \&\ \\
&\ (\text{byte}\ |\ \text{half-word}),
\end{aligned}$$

$$\begin{aligned}
\text{unsigned\_uv\_qual}(3) = &\ ((\text{sub} \ \&\ \overline{\text{signed}}\ \&\ \text{sat\_mode})| \\
&\ (\text{cmpgt} \ \&\ \overline{\text{signed}}\ )\ | \\
&\ (\text{cmpgt} \ \&\ \text{signed} \ \&\ ((\ \overline{\text{va}(24)}\ \&\ \text{vb}\ (24))\ | \\
&\ (\text{va}\ (24)\ \&\ \overline{\text{vb}(24)}\ ))))\ \&\ \\
&\ \text{byte}.
\end{aligned}$$

$$\begin{aligned}
\text{unsigned\_ov\_unqual}(0) = &\ \text{signed} \ \&\ \text{cmpgt} \ \&\ \overline{\text{va}(0)}\ \&\ \overline{\text{vb}(0)}\ \&\ \\
&\ (\text{byte}\ |\ \text{half-word}\ |\ \text{word}), \\
= &\ \text{signed} \ \&\ \text{cmpgt} \ \&\ \overline{\text{va}(0)}\ \&\ \overline{\text{vb}(0)},
\end{aligned} \quad (13)$$

$$\text{unsigned\_ov\_unqual}(1) = \text{signed} \ \&\ \text{cmpgt} \ \&\ \overline{\text{va}(8)}\ \&\ \overline{\text{vb}(8)}\ \&\ \text{byte},$$

$$\begin{aligned}
\text{unsigned\_ov\_unqual}(2) = &\ \text{signed} \ \&\ \text{cmpgt} \ \&\ \overline{\text{va}(16)}\ \&\ \overline{\text{vb}(16)}\ \&\ \\
&\ (\text{byte}\ |\ \text{half-word}),
\end{aligned}$$

$$\text{unsigned\_ov\_unqual}(3) = \text{signed} \ \&\ \text{cmpgt} \ \&\ \overline{\text{va}(24)}\ \&\ \overline{\text{vb}(24)}\ \&\ \text{byte}.$$

$$\begin{aligned}
\text{unsigned\_uv\_unqual}(0) = &\ \text{signed} \ \&\ \text{cmpgt} \ \&\ \text{va}(0)\ \&\ \text{vb}(0)\ \&\ \\
&\ (\text{byte}\ |\ \text{half-word}\ |\ \text{word}), \\
= &\ \text{signed} \ \&\ \text{cmpgt} \ \&\ \text{va}(0)\ \&\ \text{vb}(0),
\end{aligned} \quad (14)$$

$$\text{unsigned\_uv\_unqual}(1) = \text{signed} \ \&\ \text{cmpgt} \ \&\ \text{va}(8)\ \&\ \text{vb}(8)\ \&\ \text{byte},$$

$$\begin{aligned}
\text{unsigned\_uv\_unqual}(2) = &\ \text{signed} \ \&\ \text{cmpgt} \ \&\ \text{va}(16)\ \&\ \text{vb}(16)\ \&\ \\
&\ (\text{byte}\ |\ \text{half-word}),
\end{aligned}$$

$$\text{unsigned\_uv\_unqual}(3) = \text{signed} \ \&\ \text{cmpgt} \ \&\ \text{va}(24)\ \&\ \text{vb}(24)\ \&\ \text{byte}.$$

$$\begin{aligned}
\text{max\_qual}(0) = &\ ((\ \overline{\text{signed}} \ \&\ \text{max})\ |\ (\text{signed} \ \&\ \text{max} \ \&\ ((\ \overline{\text{va}(0)}\ \&\ \text{vb}(0))\ | \\
&\ (\text{va}(0)\ \&\ \overline{\text{vb}(0)}\ ))))\ \&\ (\text{byte}\ |\ \text{half-word}\ |\ \text{word}), \\
= &\ (\overline{\text{signed}} \ \&\ \text{max})\ |\ (\overline{\text{signed}} \ \&\ \text{max} \ \&\ ((\ \overline{\text{va}(0)}\ \&\ \text{vb}(0))\ | \\
&\ (\text{va}(0)\ \&\ \overline{\text{vb}(0)}\ ))),
\end{aligned} \quad (15)$$

$$\begin{aligned}
\text{max\_qual}(1) = &\ ((\overline{\text{signed}} \ \&\ \text{max})\ |\ (\text{signed} \ \&\ \text{max} \ \&\ ((\ \overline{\text{va}(8)}\ \&\ \text{vb}(8))\ | \\
&\ (\text{va}(8)\ \&\ \overline{\text{vb}(8)}\ ))))\ \&\ \text{byte},
\end{aligned}$$

$$\begin{aligned}
\text{max\_qual}(2) = &\ ((\overline{\text{signed}} \ \&\ \text{max})\ |\ (\text{signed} \ \&\ \text{max} \ \&\ ((\ \overline{\text{va}(16)}\ \&\ \text{vb}(16))\ | \\
&\ (\text{va}(16)\ \&\ \overline{\text{vb}(16)}\ ))))\ \&\ (\text{byte}\ |\ \text{half-word}),
\end{aligned}$$

$$\begin{aligned}
\text{max\_qual}(3) = &\ ((\overline{\text{signed}} \ \&\ \text{max})\ |\ (\text{signed} \ \&\ \text{max} \ \&\ (\ \overline{\text{va}(24)}\ \&\ \text{vb}(24))\ | \\
&\ (\text{va}(24)\ \&\ \overline{\text{vb}(24)}\ ))))\ \&\ \text{byte}.
\end{aligned}$$

$$\begin{aligned}
\text{min\_qual}(0) = &\ ((\ \overline{\text{signed}} \ \&\ \text{min})\ |\ (\text{signed} \ \&\ \text{min} \ \&\ ((\ \overline{\text{va}(0)}\ \&\ \text{vb}(0))\ | \\
&\ (\text{va}(0)\ \&\ \overline{\text{vb}(0)}\ ))))\ \&\ (\text{byte}\ |\ \text{half-word}\ |\ \text{word}), \\
= &\ (\overline{\text{signed}} \ \&\ \text{min})\ |\ (\text{signed} \ \&\ \text{min} \ \&\ ((\ \overline{\text{va}(0)}\ \&\ \text{vb}(0))\ | \\
&\ (\text{va}(0)\ \&\ \overline{\text{vb}(0)}\ ))),
\end{aligned} \quad (16)$$

$$\begin{aligned}
\text{min\_qual}(1) = &\ ((\ \overline{\text{signed}} \ \&\ \text{min})\ |\ (\text{signed} \ \&\ \text{min} \ \&\ ((\ \overline{\text{va}(8)}\ \&\ \text{vb}(8))\ | \\
&\ (\text{va}(8)\ \&\ \overline{\text{vb}(8)}\ ))))\ \&\ \text{byte},
\end{aligned}$$

$$\begin{aligned}
\text{min\_qual}(2) = &\ ((\ \overline{\text{signed}} \ \&\ \text{min})\ |\ (\text{signed} \ \&\ \text{min} \ \&\ ((\ \overline{\text{va}(16)}\ \&\ \text{vb}(16))\ | \\
&\ (\text{va}(16)\ \&\ \overline{\text{vb}(16)}\ ))))\ \&\ (\text{byte}\ |\ \text{half-word}),
\end{aligned}$$

$$\begin{aligned}
\text{min\_qual}(3) = &\ ((\ \overline{\text{signed}} \ \&\ \text{min})\ |\ (\text{signed} \ \&\ \text{min} \ \&\ (\ \overline{\text{va}(24)}\ \&\ \text{vb}(24))\ | \\
&\ (\text{va}(24)\ \&\ \overline{\text{vb}(24)}\ ))))\ \&\ \text{byte}.
\end{aligned}$$

$$\begin{aligned}
\text{max\_va\_unqual}(0) = &\ \text{signed} \ \&\ \text{max} \ \&\ \overline{\text{va}(0)}\ \&\ \overline{\text{vb}(0)}\ \&\ (\text{byte}\ |\ \text{half-word}\ |\ \text{word}), \\
= &\ \text{signed} \ \&\ \text{max} \ \&\ \overline{\text{va}(0)}\ \&\ \overline{\text{vb}(0)},
\end{aligned} \quad (17)$$

$$\text{max\_va\_unqual}(1) = \text{signed} \ \&\ \text{max} \ \&\ \overline{\text{va}(8)}\ \&\ \overline{\text{vb}(8)}\ \&\ \text{byte},$$

$$\text{max\_va\_unqual}(2) = \text{signed} \ \&\ \text{max} \ \&\ \overline{\text{va}(16)}\ \&\ \overline{\text{vb}(16)}\ \&\ (\text{byte}\ |\ \text{half-word}),$$

$$\text{max\_va\_unqual}(3) = \text{signed} \ \&\ \text{max} \ \&\ \overline{\text{va}(24)}\ \&\ \overline{\text{vb}(24)}\ \&\ \text{byte}.$$

$$\begin{aligned}
\text{max\_vb\_unqual}(0) = &\ \text{signed} \ \&\ \text{max} \ \&\ \text{va}(0)\ \&\ \text{vb}(0)\ \&\ (\text{byte}\ |\ \text{half-word}\ |\ \text{word}), \\
= &\ \text{signed} \ \&\ \text{max} \ \&\ \text{va}(0)\ \&\ \text{vb}(0),
\end{aligned} \quad (18)$$

$$\text{max\_vb\_unqual}(1) = \text{signed} \ \&\ \text{max} \ \&\ \text{va}(8)\ \&\ \text{vb}(8)\ \&\ \text{byte},$$

$$\text{max\_vb\_unqual}(2) = \text{signed} \ \&\ \text{max} \ \&\ \text{va}(16)\ \&\ \text{vb}(16)\ \&\ (\text{byte}\ |\ \text{half-word}),$$

```
max_vb_unqual(3) = signed & max & va(24) & vb(24) & byte.
min_va_unqual(0) = signed & min & va(0) & vb(0) & (byte | half-word | word),         (19)
                 = signed & min & va(0) & vb(0),
min_va_unqual(1) = signed & min & va(8) & vb(8) & byte,
min_va_unqual(2) = signed & min & va(16) & vb(16) & (byte | half-word),
min_va_unqual(3) = signed & min & va(24) & vb(24) & byte.
min_vb_unqual(0) = signed & $\overline{va(0)}$ & $\overline{vb(0)}$ & (byte | half-word | word),   (20)
                 = signed & $\overline{va(0)}$ & $\overline{vb(0)}$,
min_vb_unqual(1) = signed & $\overline{va(8)}$ & $\overline{vb(8)}$ & byte,
min_vb_unqual(2) = signed & $\overline{va(16)}$ & $\overline{vb(16)}$ & (byte | half-word),
min_vb_unqual(3) = signed & max & $\overline{va(24)}$ & $\overline{vb(24)}$ & byte.
```

The four bits constituting first signals 314, 315, 316, 317, 318, 320, and 352–362 in the exemplary embodiment, are associated with boundaries between the data values, for each of the data types supported by the thirty-two bits of the vector operand. Hence, bytewise operations would assert each of the four bits in the one of first signals 314–320, and 352–362 corresponding to the operation being performed. For an executing instruction operating on half-word (sixteen bit) length subvector operands, bit numbers zero and two are asserted, and for word length operands, only bit number zero is asserted.

Thus, in the general case, each of the m bits of the first signals 314–320 and 352–362 is associated, in order, with the successive boundaries between values of the smallest subvector operand. Then, for each of the data types, if the corresponding boundary is also a boundary for that data type, data type Boolean signal associated with that data type appears in the logical ORed expression for the associated one of the m bits, as shown above in the exemplary embodiment. Additionally, the subvector operand type dependent sign bits va(s) and vb(s) correspond to the generically denoted sign bit signals va_sign and vb_sign, respectively, discussed above in conjunction with Equations (3) and (4).

First signals 314–320 and 352–362 are provided to compare select unit 310. Additionally, compare select unit 310 receives vector operands VA and VB. Compare select unit 310 provides a plurality of second signals 323–330 to a plurality, m, of multiplexers (MUX) 306, discussed further below. Each of second signals 324–330 includes a plurality, m bits.

In the exemplary embodiment in which the vector operands VA and VB are thirty-two bits in size, second signals 323–330 each include four bits. Signal 323, sel_unsigned_ ov, selects the largest unsigned number, and signal 324, sel_unsigned uv, selects the smallest unsigned number. These are generated in accordance with Boolean Equations (21) and (22) respectively:

```
sel_unsigned_ov(0) = (cout(0) & unsigned_ov_qual(0)) |       (21).
                     unsigned_ov_unqual (0),
sel_unsigned_ov(1) = ((cout(8) & unsigned_ov_qual(1)) |
                     (unsigned_ov_unqual (1)) |
                     (sel_unsigned_ov(0) & (word | half-word)),
sel_unsigned_ov(2) = ((cout(16) & unsigned_ov_qual(2)) |
                     (unsigned_ov_unqual (2)) |
                     (sel_unsigned_ov(0) & word),
sel_unsigned_ov(3) = ((cout(24) & unsigned_ov_qual(3)) |
                     (unsigned_ov_unqual (3)) |
                     (sel_unsigned_ov(0) & word) |
                     (sel_unsigned_ov(2) & half-word).
sel_unsigned_uv(0) = ($\overline{cout(0)}$ & unsigned_uv_qual(0)) |    (22).
                     (unsigned_uv_unqual (0)),
sel_unsigned_uv(1) = ($\overline{(cout(8)}$ & unsigned_uv_qual(1)) |
                     (unsigned_uv_unqual (1)) |
                     (sel_unsigned_uv(0) & (word | half-word),
sel_unsigned_uv(2) = ($\overline{(cout(16)}$ & unsigned_uv_qual(2)) |
                     (unsigned_uv_unqual (2)) |
                     (sel_unsigned_uv(0) & word),
sel_unsigned_uv(3) = ($\overline{(cout(24)}$ & unsigned_uv_qual(3)) |
                     (unsigned_uv_unqual (3)) |
                     (sel_unsigned_uv(0) & word) |
                     (sel_unsigned_uv(2) & half-word).
```

Signals 325 and 326 select the operands corresponding to vector operand VA for vector maximum and vector minimum instructions, respectively. Signal 325 is determined by Boolean Equation (23):

max_sel_va(0)=(cout(0) & max_qual(0))|(max_va_unqual (0)), max_sel_va(1)=(cout(8) & signed_ov_qual(1))|(max_va_unqual (1)), max_sel_va(2)=(cout(16) & signed_ov_qual(2))|(max_va_unqual (2)), max_sel_va(3)=(cout(24) & signed_ov_qual(3))|(max_va_unqual (3))         (23).

And Boolean Equation (24) defines signal 326:

min_sel_va(0)=($\overline{cout(0)}$ & signed_uv_qual(0))|(min_va_unqual (0)), min _sel_va(1)=($\overline{cout(8)}$ & signed_uv_qual(1)) (min_va_unqual (1)), min_sel_va(2)=($\overline{cout(16)}$ & signed_uv_qual(2)) (min_va_unqual (2)), min_sel_va(3)=($\overline{cout(24)}$ & signed_uv_qual(3)) (min_va_unqual(3))         (24).

Similarly, operands corresponding to vector operand VB are selected for vector maximum and vector minimum instructions by signals 327 and 328, respectively. Signal 327 is generated in accordance with Boolean Equations (25), and signal 328 is generated according to Boolean Equation (26):

max_sel_vb(0)=$\overline{cout(0)}$ & max_qual(0))|max_vb_unqual(0), max_sel_vb(1)=$\overline{cout(8)}$ & max_qual(1))|max_vb_unqual(1), max_sel_vb(2)=$\overline{cout(16)}$ & max_qual(2))|max_vb_unqual(2), max_sel_vb(3)=$\overline{cout(24)}$ & max_qual(3))|max_vb_unqual(3)         (25).

min_sel_vb(0)=cout(0) & min_qual(0))|min_vb_unqual(0), min_sel_vb(1)=cout(8) & min_qual(1))|min_vb_unqual(1), min_sel_vb(2)=cout(16) & min_qual(2))|min_vb_unqual(2), min_sel_vb(3)=cout(24) & min_qual(3))|min_vb_unqual(3)  (26).

Additionally, signal 329 selects operand VA:

$$\begin{aligned}
\text{sel\_va}(0) &= \text{max\_sel\_va}(0) \,|\, \text{min\_sel\_va}(0), \\
\text{sel\_va}(1) &= ((\text{max\_sel\_va}(1) \,|\, \text{min\_sel\_va}(1)) \,|\, \\
& \quad (\text{sel\_va}(0) \,\&\, (\text{word} \,|\, \text{half-word})), \\
\text{sel\_va}(2) &= ((\text{max\_sel\_va}(2) \,|\, \text{min\_sel\_va}(2)) \,|\, \\
& \quad (\text{sel\_va\_}(0) \,\&\, \text{word}), \\
\text{sel\_va}(3) &= ((\text{max\_sel\_va}(3) \,|\, \text{min\_sel\_va}(3)) \,|\, \\
& \quad (\text{sel\_va\_}(0) \,\&\, \text{word}) \,|\, \\
& \quad (\text{sel\_va}(2) \,\&\, \text{half-word}).
\end{aligned} \quad (27)$$

And, signal 330 selects operand VB:

$$\begin{aligned}
\text{sel\_vb}(0) &= \text{max\_sel\_vb}(0) \,|\, \text{min\_sel\_vb}(0), \,| \\
\text{sel\_vb}(1) &= ((\text{max\_sel\_vb}(1) \,|\, \text{min\_sel\_vb}(1)) \,|\, \\
& \quad (\text{sel\_vb}(0) \,\&\, (\text{word} \,|\, \text{half-word})), \\
\text{sel\_vb}(2) &= ((\text{max\_sel\_vb}(2) \,|\, \text{min\_sel\_vb}(2)) \,|\, \\
& \quad (\text{sel\_vb}(0) \,\&\, \text{word}), \\
\text{sel\_vb}(3) &= (\text{max\_sel\_vb}(3) \,|\, \text{min\_sel\_vb}(3)) \,|\, \\
& \quad (\text{sel\_vb}(0) \,\&\, \text{word}) \,|\, \\
& \quad (\text{sel\_vb}(2) \,\&\, \text{half-word}).
\end{aligned} \quad (28)$$

Signals 329 and 330 implement maximum/minimum instructions. In an alternative embodiment, datatype qualification terms may be ORed into bits (1:3) of signals 325–328, rather than into bits (1:3) of select signal 329. Such an embodiment is an implementation analogous to that for signals 323–326, hereinabove. It would be understood by an artisan of ordinary skill that such an alternative embodiment would be within the spirit and scope of the present invention.

Signals $c_0(i)$ and $c_1(i)$, above, represent carry-out bits from a most significant bit (MSB) and a next to most significant bit (NMSB) of the result produced by the operation on subvector operands va and vb corresponding to the executing instruction. For the exemplary embodiment, the carry-out signals are generated for the bit numbers as indicated in Equations (23)–(28) above.

Carry-out signals $c_0$ and $c_1$ are generated using carry lookahead circuitry included in select unit 310. Such carry lookahead circuitry generates carry-out signals $c_j$, $j=0,1,\ldots,$ n·1, for n-bit operands in accordance with:

$g_j=va_j \,\&\, vb_j$, $p_j=va_j \oplus vb_j$, and $c_{j-1}=g_j|(c_j \,\&\, p_j)$,
   $j=n-1, \ldots, 1$.  (29).

The $va_j$ and $vb_j$ represent the jth bit of operands va and vb, respectively, and the g are typically referred to as carry generate signals and the $p_j$ are typically referred to as carry propagate signals. Carry-out signals $c_0$ and $c_1$ generated according to Boolean Equation (31) may then be logically combined with the first signals in accordance with Boolean Equations (23)–(28) using conventional combinatoric logic, such as inverters, AND gates, OR gates, and their complements.

Figure 4:
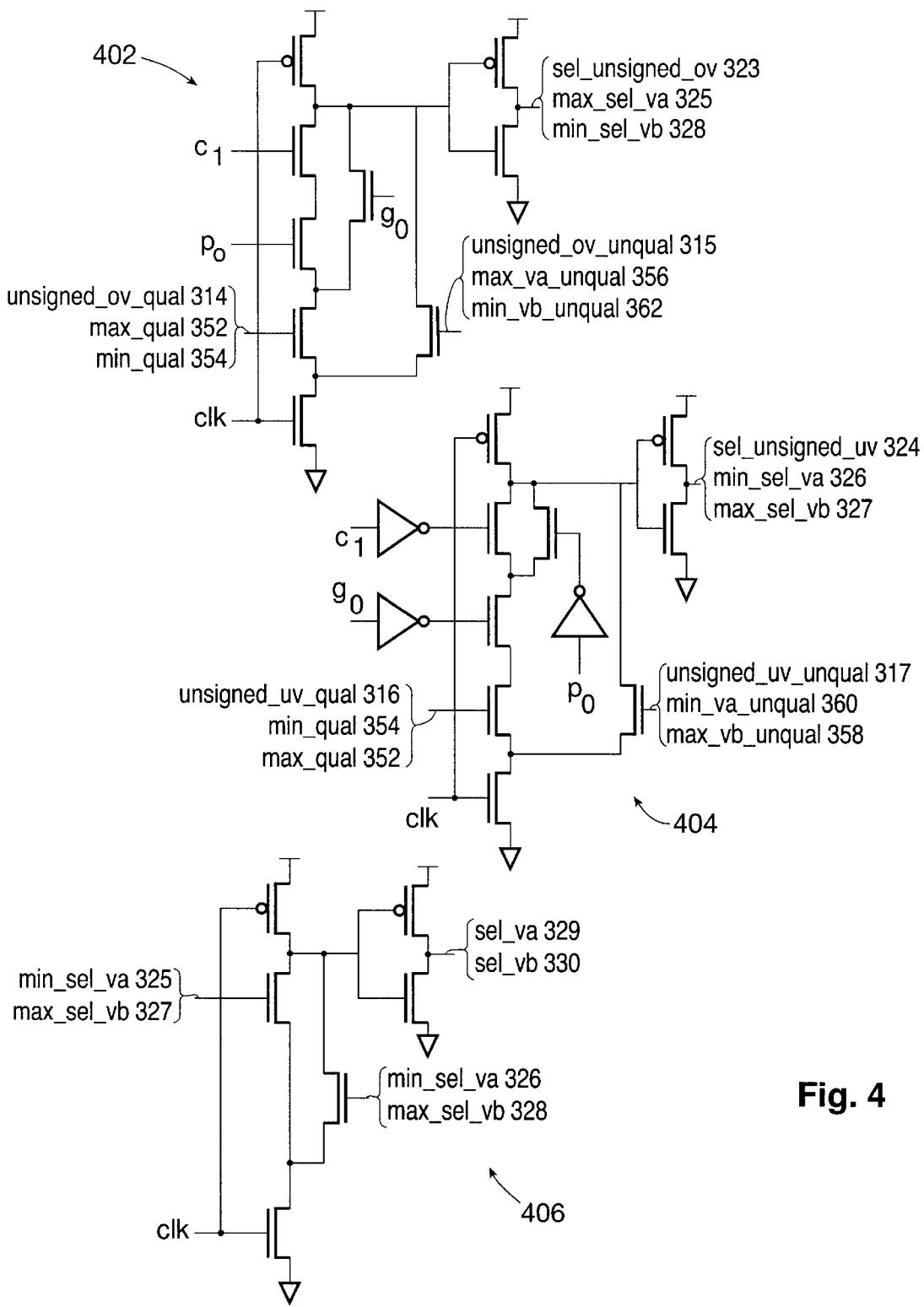
FIG. 4 illustrates a portion of carry-out logic in accordance with an embodiment of the present invention.

Alternatively, the conventional combinatoric logic may be folded into the carry lookahead circuitry implementing Boolean Equation (31). In order to generate second signals 323–330, final carry lookahead logic may be implemented as illustrated in FIG. 4. Control signal 323, defined in Boolean Equation (23), may be generated using dynamic logic stack 402, wherein the signals $c_1$, $g_0$, $p_0$, $c_2$, $g_1$, and $p_1$ are as defined in Boolean Equation (31). Similarly, a dynamic logic stack 402 may also be used to generate signals 325 and 328, as defined by Boolean Equations (25) and (28), respectively. Dynamic logic stack 404 in the final carry lookahead logic, signal 324, may be generated. Likewise, dynamic logic circuits may also be used to generate signals 326 and 327, in accordance with Boolean Equation (26) and Boolean Equation (27), respectively. Dynamic logic OR circuit 406 may be used to generate signals 329 and 330, corresponding to the input of signals 325 and 326, or signals 327 and 328, respectively.

MUX 306 selects for outputting one of a plurality of input signals 332–340 in response to second signals 324–330. Input signal 332 constitutes the operands VA and VB. Signals 334 and 336 represent predetermined comparison values for each data type subvector operand. In the general case, there are 4·m such values. If none of the second signals 324–330 is asserted, MUJX 306 selects for the output one of VA and VB. Otherwise, the corresponding one of the true/false comparison values, in accordance with the control signal asserted, is selected for outputting via MUX 306.

In this way, output selection is implemented without adding delays. The delay in selecting the output is substantially the same as the delay to compute the arithmetic results in accordance with the mechanism described in the co-pending commonly owned U.S. patent application entitled "Saturation Detection Apparatus and Method Therefor," Ser. No. 09/315,545, incorporated herein by reference.

Although the present invention and its advantages have been described in detail, it should be understood that various changes, substitutions and alterations can be made herein without departing from the spirit and scope of the invention as defined by the appended claims.

What is claimed is:

1. A compare and maximum/minimum apparatus comprising:
   a compare generation unit having first and second operand inputs operable for receiving first and second vector operands, said compare generation unit operable for receiving an instruction signal, said compare generation unit outputting one or more second signals in response to said first and second operands and said instruction signal; and
   selection circuitry operable for receiving said one or more of second signals, at least one operand signal, and one or more comparison value signals, wherein said selection circuitry selects one of said operand signals and said one or more of said comparison value signals in response to said one or more second signals, and wherein each of said one or more second signals comprise a Boolean combination of a carryout signal and one or more qualifier and unqualifier signals.

2. The apparatus of claim 1 wherein said first and second vector operands include a plurality of data portions, each of said data portions being operable, alone or in combination with preselected other data portions, as first and second operands of a corresponding vector instruction.

3. The apparatus of claim 1 wherein said selection circuitry comprises at least one multiplexer (MUX).

4. A compare and maximum/minimum apparatus comprising:
   a compare generation unit having first and second operand inputs operable for receiving first and second vector operands, said compare generation unit operable for receiving an instruction signal, said compare generation unit outputting one or more second signals in response to said first and second operands and said instruction signal; and selection circuitry operable for receiving said one or more of second signals, at least one operand signal, and one or more comparison value signals, wherein said selection circuitry selects one of said operand signals and said one or more of said comparison value signals in response to said one or more second signals, and wherein said compare generation unit comprises:

qualifier logic coupled to said first and second operand inputs, said qualifier logic operable for receiving said first and second vector operands and said instruction signal, said qualifier logic outputting a plurality of first signals; and select logic operable for receiving said plurality of first signals said select logic outputting said plurality of second signals in response to said plurality of first signals.

5. The apparatus of claim 4 wherein said select logic comprises:

a carry lookahead unit operable for outputting a carry-out bit from a next to most significant bit (NMSB) of a preselected operand pair, carry-propagate bits from a most significant bit (MSB) and said NMSB of said preselected operand pair, carry-generate bits of said MSB and said NMSB of said preselected operand pair, and a carry-in bit for said MSB of said preselected operand pair;

a first plurality of logic circuits operable for receiving a first plurality of input signals, said first plurality of input signals including said carry-propagate bit from said MSB, said carry-generate bit of said MSB, said carry-out bit of said NMSB and a first plurality of said first signals, wherein said first plurality of logic circuits outputs a first set of said plurality of second signals in response to said plurality of input signals; and a second plurality of logic circuits operable for receiving a second plurality of input signals, said second plurality of input signals including said carry-propagate bit of said MSB, said carry-generate bit of said MSB, said carry-in bit for said MSB and a second plurality of said first signals, wherein said second plurality of logic circuits outputs a second set of said plurality of second signals in response to said second plurality of input signals.

6. The apparatus of claim 4 wherein said select logic comprises:

a carry lookahead unit operable for outputting a carry-out bit from a next to most significant bit (NMSB) of a preselected operand pair, and a carry-out bit from a most significant bit of said preselected operand pair;

a first plurality of logic circuits operable for receiving said carry-out bit from said NMSB and a first plurality of said first signals, said first plurality of logic circuits outputting a first plurality of said selection signals in response thereto; and a second plurality of logic circuits operable for receiving said carry-out bit from said NMSB and a second plurality of said first signals, said second plurality of logic circuits outputting a first plurality of said selection signals in response thereto.

7. The apparatus of claim 6 wherein said first plurality of first signals includes unsigned_ov_unqual, max_qual_signals, min_qual and max_va_unqual and min_vb_unqual signals, and said second plurality includes unsigned_uv_qual, unsigned_uv_unqual, min_qual, max_qual, min_va_unqual, and max_vb_unqual signals.

8. The apparatus of claim 4 wherein said plurality of first signals includes ten signals:

a first one of said plurality generated in response to a first logical value defined by:

$$(\text{sub} \& \overline{\text{signed}} \& \text{sat\_mode})|(\text{cmpgt} \& \overline{\text{signed}})|(\text{cmpgt} \& \text{signed} \& (\overline{\text{va\_sign}} \& \text{vb\_sign})|(\text{va\_sign} \& \overline{\text{vb\_sign}})));$$

a second one of said plurality defined by:

$$(\text{add} \& \overline{\text{signed}} \& \text{sat\_mode})|(\text{cmpgt} \& \overline{\text{signed}}) (\text{cmpgt} \& \text{signed} \& ((\overline{\text{va\_sign}} \& \text{vb\_sign})|(\text{va\_sign} \& \overline{\text{vb\_sign}})));$$

a third one of said plurality defined by:

$$\text{cmpgt} \& \text{signed} \& (\overline{\text{va\_sign}} \& \overline{\text{vb\_sign}});$$

a fourth one of said plurality defined by:

$$\text{cmpgt} \& \overline{\text{signed}} \& (\text{va\_sign} \& \text{vb\_sign});$$

a fifth one of said plurality defined by:

$$(\text{max} \& \overline{\text{signed}})|(\text{max} \& \text{signed} \& ((\overline{\text{va\_sign}} \& \text{vb\_sign})|(\text{va\_sign} \& \overline{\text{vb\_sign}})));$$

a sixth one of said plurality defined by:

$$(\text{min} \& \overline{\text{signed}})|(\text{min} \& \text{signed} \& ((\overline{\text{va\_sign}} \& \text{vb\_sign})|(\text{va\_sign} \& \overline{\text{vb\_sign}})));$$

a seventh one of said plurality defined by:

$$\text{max} \& \text{signed} \& (\overline{\text{va\_sign}} \& \overline{\text{vb\_sign}});$$

an eighth one of said plurality defined by:

$$\text{max} \& \text{signed} \& (\text{va\_sign} \& \text{vb\_sign});$$

a ninth one of said plurality defined by:

$$\text{min} \& \text{signed} \& (\text{va\_sign} \& \text{vb\_sign}); \text{ and,}$$

a tenth one of said plurality defined by:

$$\text{min} \& \text{signed} \& (\overline{\text{va\_sign}} \& \overline{\text{vb\_sign}}),$$

wherein said max, signed, min, and cmpgt signals are generated from said instruction signal, said max has a first predetermined Boolean value when a maximum instruction is executed and a second predetermined Boolean value otherwise, said signed signal has said first Boolean value when a signed instruction is executed and said second Boolean value otherwise, said min signal has said first Boolean value when a minimum instruction is executed and said second Boolean value otherwise, and said cmpgt signal has said first Boolean value when a compare instruction is executed and said second Boolean value otherwise, and said va_sign and vb_sign signals represent preselected sign bits of first and second operands corresponding to an executing instruction.

9. The apparatus of claim 8 wherein each of said plurality of first signals, further include a plurality, m of bits, each bit being generated in farther response to a logical AND of each of said plurality first signals with a logical OR of one or more data type signals for each bit of said plurality of bits, wherein said one or more data type signals are generated in response to a subvector operand length.

10. A method of compare and maximum/minimum generation comprising the steps of:
  generating a set of first signals in response to an executing instruction;
  generating a set of second signals in response to a carry-out signal and said set of first signals; and
  selecting for outputting one of a set of output signals including one or more operand signals and a predetermined set of comparison value signals in response to said set of second signals, wherein said first, second and carry-out signals are generated in response to a pair of subvector operands, and a result signal is generated in response to said executing instruction.

11. The method of claim 10 wherein said pair of subvector operands comprise first and second vector operands.

12. The method of claim 10 wherein said selecting step comprises the steps of:
  providing said second signals to at least one multiplexer (MUX);
  providing said set of output signals to corresponding inputs of said at least one MUX; and
  controlling said at least one MUX in response to said second signals.

13. The method of claim 10 wherein said carry-out signal comprises a carry-out signal generated by a most significant bit (MSB) of said pair of subvector.

14. The method of claim 10 wherein said step of generating a set of second signals comprises the steps of:
  ANDing a first one of a first subset of said plurality of first signals with said carry-out signal;
  ORing a result thereof with a first one of said second subset of said plurality of first signals;
  ANDing a second one of said first subset of said plurality of first signals with a complement of said carry-out signal; and
  ORing a result thereof with a second one of said second subset of said plurality of first signals.

15. The method of claim 10 wherein said step of generating a set of first signals comprises the steps of:
  generating a first one of said plurality of first signals according to:
  (sub & $\overline{\text{signed}}$ & sat_mode)|(cmpgt & $\overline{\text{signed}}$)|(cmpgt & signed & ($\overline{\text{va\_sign}}$ & vb_sign)|(va_sign & $\overline{\text{vb\_sign}}$))), wherein said cmpgt signal, and said signed signal are provided in response to said executing instruction;
  generating a second one of said plurality of first signals according to:

(add & $\overline{\text{signed}}$ & sat_mode)|(cmpgt & $\overline{\text{signed}}$)|(cmpgt & signed & (($\overline{\text{va\_sign}}$ & vb_sign)|(va_sign & $\overline{\text{vb\_sign}}$)));

generating a third one of said plurality of first signals according to:

cmpgt & signed & ($\overline{\text{va\_sign}}$ & $\overline{\text{vb\_sign}}$);

generating a fourth one of said plurality of first signals according to:

cmpgt & signed & (va_sign & vb_sign);

generating a fifth one of said plurality of first signals according to:

(max & $\overline{\text{signed}}$)|(max & signed & (($\overline{\text{va\_sign}}$ & vb_sign)|(va_sign & $\overline{\text{vb\_sign}}$)));

generating a sixth one of said plurality of first signals according to:

(min & $\overline{\text{signed}}$)|(min & signed & (($\overline{\text{va\_sign}}$ & vb_sign)|(va_sign & $\overline{\text{vb\_sign}}$)));

generating a seventh one of said plurality of first signals according to:

max & signed & ($\overline{\text{va\_sign}}$ & $\overline{\text{vb\_sign}}$);

generating an eighth one of said plurality of first signals according to:

max & signed & (va_sign & vb_sign);

generating a ninth one of said plurality of first signals according to:

min & signed & (va_sign & vb_sign); and, generating a tenth one of said plurality of first signals according to:

min & signed & ($\overline{\text{va\_sign}}$ & $\overline{\text{vb\_sign}}$), wherein said max and min signals are generated from said instruction signal, said max signal has a first predetermined Boolean value when a maximum instruction is executed and a second predetermined Boolean value otherwise, said signed signal has said first Boolean value when a signed instruction is executed and said second Boolean value otherwise, said min signal has said first Boolean value when a minimum instruction is executed and said second Boolean value otherwise, and said cmpgt signal has said first Boolean value when a compare instruction is executed and said second Boolean value otherwise, and said va_sign and vb_sign signals represent preselected sign bits of first and second operands corresponding to an executing instruction.

16. The method of claim 15 wherein each signal of said set of first signals includes a plurality of bits, and wherein said step of generating said set of first signals further comprises the step of ANDing each of said plurality of first signals with a logical OR of one or more data type signals for each bit of said plurality of bits, wherein said one or more data type signals is generated in response to an subvector operand length.

17. The method of claim 16 wherein said plurality of bits includes m bits.

18. A data processing system comprising:
  a central processing unit (CPU);
  a memory operable for communicating instructions and operand data to said CPU, said CPU comprising:
    instruction decode circuitry operable for receiving said instructions; and
    compare and maximum/minimum circuitry, coupled to said memory, wherein said compare and maximum/minimum circuitry is operable for receiving said operand data from said memory, and operable for selecting one of a plurality of output signals, wherein said plurality of output signals includes said operand data and a preselected set of comparison value signals, said compare and maximum/minimum circuitry selecting said one of said plurality in response to said operand data and an instruction signal from said decode circuitry, wherein said compare and maximum/minimum circuitry comprises:
  a compare generation unit having first and second operand inputs operable for receiving first and second operand data, said compare generation unit operable for receiving said instruction signal, said compare generation unit outputting a plurality of second signals in response to said first and second operand data and said instruction signal; and
  selection circuitry operable for receiving said plurality of second signals and said plurality of output signals, and wherein each of said one or more second signals comprise a Boolean combination of a carryout signal and one or more qualifier and unqualifier signals.

19. The data processing system of claim 18 wherein said CPU further comprises a vector unit, said vector unit including said compare and maximum/minimum circuitry.

20. The data processing system of claim 18 wherein said selection circuitry comprises at least one multiplexer (MUX).

21. A data processing system comprising:
  a central processing unit (CPU);
  a memory operable for communicating instructions and operand data to said CPU, said CPU comprising:
    instruction decode circuitry operable for receiving said instructions; and
    compare and maximum/minimum circuitry, coupled to said memory, wherein said compare and maximum/minimum circuitry is operable for receiving said operand data from said memory, and operable for selecting one of a plurality of output signals, wherein said plurality of output signals includes said operand data and a preselected set of comparison value signals, said compare and maximum/minimum circuitry selecting said one of said plurality in response to said operand data and an instruction signal from said decode circuitry, wherein said CPU further comprises a vecror unit, said vector unit including said compare and maximum/minimum circuitry, and wherein said compare and maximum/minimum circuitry comprises:
      qualifier logic operable for receiving said first and second operand data and said instruction signal, said qualifier logic outputting a plurality of first signals, each first signal including m bits; and
      select logic operable for receiving said plurality of first signals said select logic outputting said plurality of second signals in response to said plurality of first signals.

22. The data processing system of claim 21 wherein said plurality of first signals includes ten signals:
  a first one of said plurality generated in response to a first logical value defined by:

$(sub\ \&\ \overline{signed}\ \&\ sat\_mode)|(cmpgt\ \&\ \overline{signed})|(cmpgt\ \&\ signed\ \&\ (\overline{va\_sign}\ \&\ vb\_sign)|(va\_sign\ \&\ \overline{vb\_sign})));$ a second one of said plurality defined by:

$(add\ \&\ \overline{signed}\ \&\ sat\_mode)|(cmpgt\ \&\ signed)\ (cmpgt\ \&\ signed\ \&\ ((\overline{va\_sign}\ \&\ vb\_sign)|(va\_sign\ \&\ \overline{vb\_sign})));$ a third one of said plurality defined by:

$cmpgt\ \&\ signed\ \&\ (\overline{va\_sign}\ \&\ \overline{vb\_sign});$ a fourth one of said plurality defined by:

$cmpgt\ \&\ signed\ \&\ (va\_sign\ \&\ vb\_sign);$ a fifth one of said plurality defined by:

$(max\ \&\ \overline{signed})|(max\ \&\ signed\ \&\ ((\overline{va\_sign}\ \&\ vb\_sign)|(va\_sign\ \&\ \overline{vb\_sign})));$ a sixth one of said plurality defined by:

$(min\ \&\ \overline{signed})|(min\ \&\ signed\ \&\ ((\overline{va\_sign}\ \&\ vb\_sign)|(va\_sign\ \&\ \overline{vb\_sign})));$ a seventh one of said plurality defined by:

$max\ \&\ signed\ \&\ (\overline{va\_sign}\ \&\ \overline{vb\_sign});$ an eighth one of said plurality defined by:

$max\ \&\ signed\ \&\ (va\_sign\ \&\ vb\_sign);$ a ninth one of said plurality defined by:

$min\ \&\ signed\ \&\ (va\_sign\ \&\ vb\_sign);$ and, a tenth one of said plurality defined by:

$min\ \&\ signed\ \&\ (\overline{va\_sign}\ \&\ \overline{vb\_sign}),$ wherein said max, signed, min, and cmpgt signals are generated from said instruction signal, said add has a first predetermined Boolean value when a maximum instruction is executed and a second predetermined Boolean value otherwise, said signed signal has said first Boolean value when a signed instruction is executed and said second Boolean value otherwise, said min signal has said first Boolean value when a minimum instruction is executed and said second Boolean value otherwise, and said cmpgt signal has said first Boolean value when a compare instruction is executed and said second Boolean value otherwise, and said va_sign and vb_sign signals represent preselected sign bits of first and second operands corresponding to an executing instruction.

23. The data processing system of claim 22 wherein each of said plurality of first signals farther include a plurality, m, of bits, each bit being generated in further response to a logical AND of each of said plurality of first signals with a logical OR of one or more data type signals for each bit, said data type signals generated in response to said instruction signal.

* * * * *

UNITED STATES PATENT AND TRADEMARK OFFICE
CERTIFICATE OF CORRECTION

PATENT NO. : 6,470,440 B1  
DATED : October 22, 2002  
INVENTOR(S) : Huy Van Nguyen and Charles Philip Roth It is certified that error appears in the above-identified patent and that said Letters Patent is hereby corrected as shown below:

Column 14,
Line 16, please replace "(add & signed & sat_mode)|(cmpgt & signed) (cmpgt & signed & ((va_sign & vb_sign)|(va_sign & vb_sign)));" with -- (add & signed & sat_mode)|(cmpgt & signed)|(cmpgt & signed & ((va_sign & vb_sign)|(va_sign & vb_sign))); --.
Line 19, please replace "cmpgt & signed & (va_sign & vb_sign);" with -- cmpgt & signed & (va_sign & vb_sign); --.

Column 15,
Line 1, please replace "farther" with -- further --.

Signed and Sealed this

Thirteenth Day of May, 2003

JAMES E. ROGAN  
*Director of the United States Patent and Trademark Office*